United States Patent
Kimura

(10) Patent No.: US 7,663,339 B2
(45) Date of Patent: Feb. 16, 2010

(54) BATTERY PACK HAVING A COMMUNICATOR FOR COMMUNICATING WITH ELECTRIC DEVICE AND ELECTRIC DEVICE USING THE SAME

(75) Inventor: Tadao Kimura, Hyogo (JP)

(73) Assignee: Panasonic Corporation, Osaka (JP)

( * ) Notice: Subject to any disclaimer, the term of this patent is extended or adjusted under 35 U.S.C. 154(b) by 373 days.

(21) Appl. No.: 11/730,648

(22) Filed: Apr. 3, 2007

(65) Prior Publication Data

US 2007/0236173 A1 Oct. 11, 2007

(30) Foreign Application Priority Data

Apr. 6, 2006 (JP) .............................. 2006-105221

(51) Int. Cl.
*H01M 10/46* (2006.01)
(52) U.S. Cl. .................................................. 320/107
(58) Field of Classification Search ................. 320/106, 320/107, 110, 112, 116
See application file for complete search history.

(56) References Cited

U.S. PATENT DOCUMENTS

| | | | |
|---|---|---|---|
| 6,198,252 B1 | 3/2001 | Mukainakano | |
| 6,271,643 B1 * | 8/2001 | Becker et al. | 320/112 |
| 2002/0101218 A1 * | 8/2002 | Koenck et al. | 320/140 |
| 2006/0006841 A1 * | 1/2006 | Lee | 320/116 |
| 2009/0021219 A1 * | 1/2009 | Yoda et al. | 320/137 |

FOREIGN PATENT DOCUMENTS

| | | |
|---|---|---|
| JP | 8-83627 | 3/1996 |
| JP | 11-341689 | 12/1999 |

* cited by examiner

*Primary Examiner*—Edward Tso
(74) *Attorney, Agent, or Firm*—McDermott Will & Emery LLP

(57) ABSTRACT

A battery pack includes: a secondary battery; a positive electrode terminal for connecting a positive electrode of the secondary battery to an external electric device; a negative electrode terminal for connecting a negative electrode of the secondary battery to the electric device; a communicator for communicating with the electric device; a communication terminal adapted to be used in connecting the communicator to the electric device to send a signal for the communication; and an electric power receiving terminal for receiving an electric power from the electric device to operate the communicator, wherein the communicator is operated by the electric power received by the electric power receiving terminal.

13 Claims, 6 Drawing Sheets

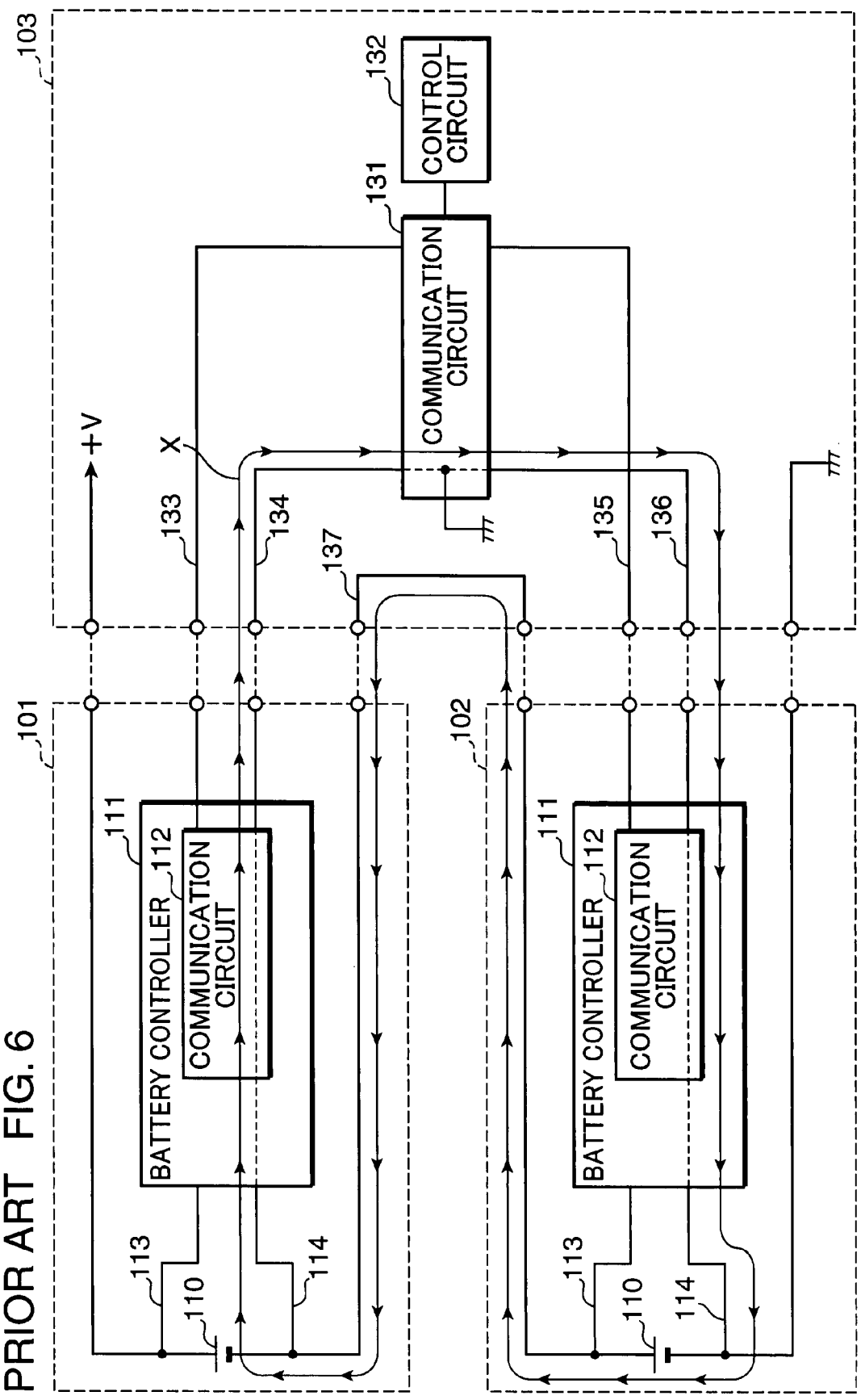
PRIOR ART FIG. 6

BATTERY PACK HAVING A COMMUNICATOR FOR COMMUNICATING WITH ELECTRIC DEVICE AND ELECTRIC DEVICE USING THE SAME

BACKGROUND OF THE INVENTION

1. Field of the Invention

The present invention relates to a battery pack having a communication function, and an electric device using the battery pack.

2. Description of the Background Art

It is known that a secondary battery, particularly, a sealed secondary battery may cause a hazardous condition such as leakage of an electrolyte or emission of an inflammable gas, if the secondary battery is overcharged, overdischarged, or reverse charged in excess of an adequate amount. In view of this, generally, a battery pack with a built-in secondary battery has a battery controller for controlling a current circuit switching device such as an electromagnetic contactor or a semiconductor switching device to monitor a condition of the battery, and to suspend charge/discharge of the battery by opening a charge/discharge circuit; or for requesting an electric device of an appropriate charge/discharge by communicating a battery condition to the electric device. In particular, most of the battery packs with built-in lithium secondary batteries are provided with a battery controller having the above arrangement in view of a likelihood that a hazardous condition may occur in overcharge or overdischarge. Generally, in the case where a battery controller is provided with a communication function to communicate with an electric device, a microcomputer is loaded in the battery controller. In many of the cases, an electric power for driving the microcomputer or a like device is supplied from the secondary battery provided in the battery pack (see e.g. Japanese Unexamined Patent Publication No. Hei 8-083627).

Also, it is a general practice that the battery controller is operative to send, to the electric device, information indicating the condition of the secondary battery provided in the battery pack by communicating with the electric device using the battery pack so that the electric device can properly use the battery pack based on the battery condition information (see e.g. Japanese Unexamined Patent Publication No. Hei 11-341689).

The battery packs are used with a variety of kinds of electric devices, and different output voltages are required for the battery packs. In view of this, the battery packs are individually manufactured, in which the number of series-connected secondary batteries to be loaded in the battery packs is changed in accordance with a voltage required for the individual electric devices.

As mentioned above, in the case where battery packs with different output voltages are manufactured for the electric devices, in which different power source voltages are required, the number of the kinds of battery packs is increased, and it is necessary to design and develop battery cases, battery controllers, or like devices for the different kinds of battery packs. This may increase the cost relating to designing/development, and extend the time required for designing/development. In view of this, there is proposed an idea of setting the output voltages of the respective battery packs to a fixed value, and connecting the battery packs to an electric device by series-connecting the battery packs of the number corresponding to a voltage required for the electric device. This may be advantageous in reducing the cost relating to designing/development, and the time required for designing/development, considering a merit that various electric devices are operable by use of the battery packs of the same kind.

In the conventional arrangement, however, use of the electric device, with the battery packs being connected in series to the electric device, may cause a short-circuit between the secondary batteries through a communication circuit in communicating with the electric device, and render the electric device inoperable, because ground potentials of power suppliers of the battery controllers are different among the battery packs. FIG. 6 is a diagram for describing how a short-circuit occurs in the case where the battery packs according to the background art are connected in series to the electric device.

The battery pack 101 shown in FIG. 6 has a secondary battery 110 and a battery controller 111. The battery controller 111 is constituted of e.g. a microcomputer with a built-in communication circuit 112. A wiring 113 connected to the positive electrode of the secondary battery 110, and a wiring 114 connected to the negative electrode of the secondary battery 110 are adapted to supply a power source voltage for operating the battery controller 111 and the communication circuit 112. A battery pack 102 has an arrangement identical to the arrangement of the battery pack 101.

An electric device 103 operable by connecting the battery packs 101 and 102 in series is provided with a communication circuit 131 for communicating with e.g. the battery packs 101 and 102, and a control circuit 132 for performing an adequate control based on battery information received by the communication circuit 131. A communication wiring 133 for transmitting a communication signal, and a communication wiring 134 for transmitting a reference potential of the communication signal are connected between the communication circuit 112 of the battery pack 101, and the communication circuit 131. A communication wiring 135 for transmitting a communication signal, and a communication wiring 136 for transmitting a reference potential of the communication signal are connected between the communication circuit 112 of the battery pack 102, and the communication circuit 131. Further, a wiring 137 for connecting the battery pack 101 and the battery pack 102 in series is provided.

In the above arrangement, as shown in FIG. 6, when the battery packs 101 and 102 are connected to the electric deice 103, the reference potential of the communication signal is set to the reference potential of the power source voltage for operating the communication circuit 112 i.e. the negative electrode potential of the secondary battery 110. Accordingly, as shown by the short-circuit path X, the secondary battery 110 of the battery pack 102 is short-circuited from the positive electrode of the secondary battery 110 of the battery pack 102 via the wiring 137, the wiring 114 of the battery pack 101, the communication circuit 112 of the battery pack 101, the communication wiring 134, the communication circuit 131, the communication wiring 136, the communication circuit 112 of the battery pack 102, and the wiring 114 of the battery pack 102 to the negative electrode of the secondary battery 110 of the battery pack 102. Thereby, the series-connected battery packs 101 and 102 are rendered unusable.

SUMMARY OF THE INVENTION

In view of the above problems residing in the conventional examples, it is an object of the present invention to provide a battery pack, equipped with a communicator for communicating with an electric device, which is free from a short-circuit of a secondary battery by series-connecting the secondary battery in plural numbers, as well as an electric device adapted to be usable by series-connecting the battery packs.

A battery pack according to an aspect of the invention comprises: a secondary battery; a positive electrode terminal for connecting a positive electrode of the secondary battery to an external electric device; a negative electrode terminal for connecting a negative electrode of the secondary battery to the electric device; a communicator for communicating with the electric device; a communication terminal adapted to be used in connecting the communicator to the electric device to send a signal for the communication; and an electric power receiving terminal for receiving an electric power from the electric device to operate the communicator, wherein the communicator is operated by the electric power received by the electric power receiving terminal.

In the above arrangement, the output power of the secondary battery is supplied to the electric device by the positive electrode terminal and by the negative electrode terminal. The communicator is operative to send the signal for communication via the communication terminal. The electric power for operating the communicator is received by the electric power receiving terminal, which is provided independently of the positive electrode terminal and the negative electrode terminal. This arrangement enables to eliminate formation of a short-circuit path, which may short-circuit the secondary battery through the communicator in series-connecting the battery packs having the above arrangement. Thus, there is no likelihood that the secondary battery may be short-circuited in series-connecting the battery packs.

An electric device according to another aspect of the invention is an electric device connectable to the aforementioned battery pack in plural numbers. The electric device comprises: a connection wiring for series-connecting the secondary batteries provided in the battery packs in connecting the battery packs; device-side communication terminals each adapted to be connected to the communication terminal of a corresponding one of the battery packs; and device-side electric power output terminals, each adapted to be connected to the electric power receiving terminal of the corresponding one of the battery packs, for outputting the electric power to operate the communicator.

In the above arrangement, in loading the plural battery packs, the secondary batteries provided in the battery packs are connected in series by the connection wiring. Also, the communication terminals of the battery packs are respectively connected to the device-side communication terminals. Thus, the battery packs are rendered communicable with each other via the device-side communication terminals. The device-side electric power output terminals for outputting the electric power to operate the communicators are respectively connected to the electric power receiving terminals of the battery packs. Thereby, the electric power for operating the communicators is supplied to the battery packs via the device-side electric power output terminals. In this arrangement, the electric power for operating the communicators is received by the electric power receiving terminals, which are provided independently of the positive electrode terminals and the negative electrode terminals of the battery packs. This arrangement enables to eliminate formation of a short-circuit path, which may short-circuit the secondary battery through the communicator in series-connecting the battery packs having the above arrangement. Thus, there is no likelihood that the secondary battery may be short-circuited in series-connecting the battery packs.

These and other objects, features and advantages of the present invention will become more apparent upon reading the following detailed description along with the accompanying drawing.

BRIEF DESCRIPTION OF THE DRAWINGS

FIG. 6 is an explanatory diagram for describing how a short-circuit occurs in the case where battery packs according to a background art are connected in series to an electric device.

DETAILED DESCRIPTION OF THE PREFERRED EMBODIMENTS OF THE INVENTION

Figure 1:
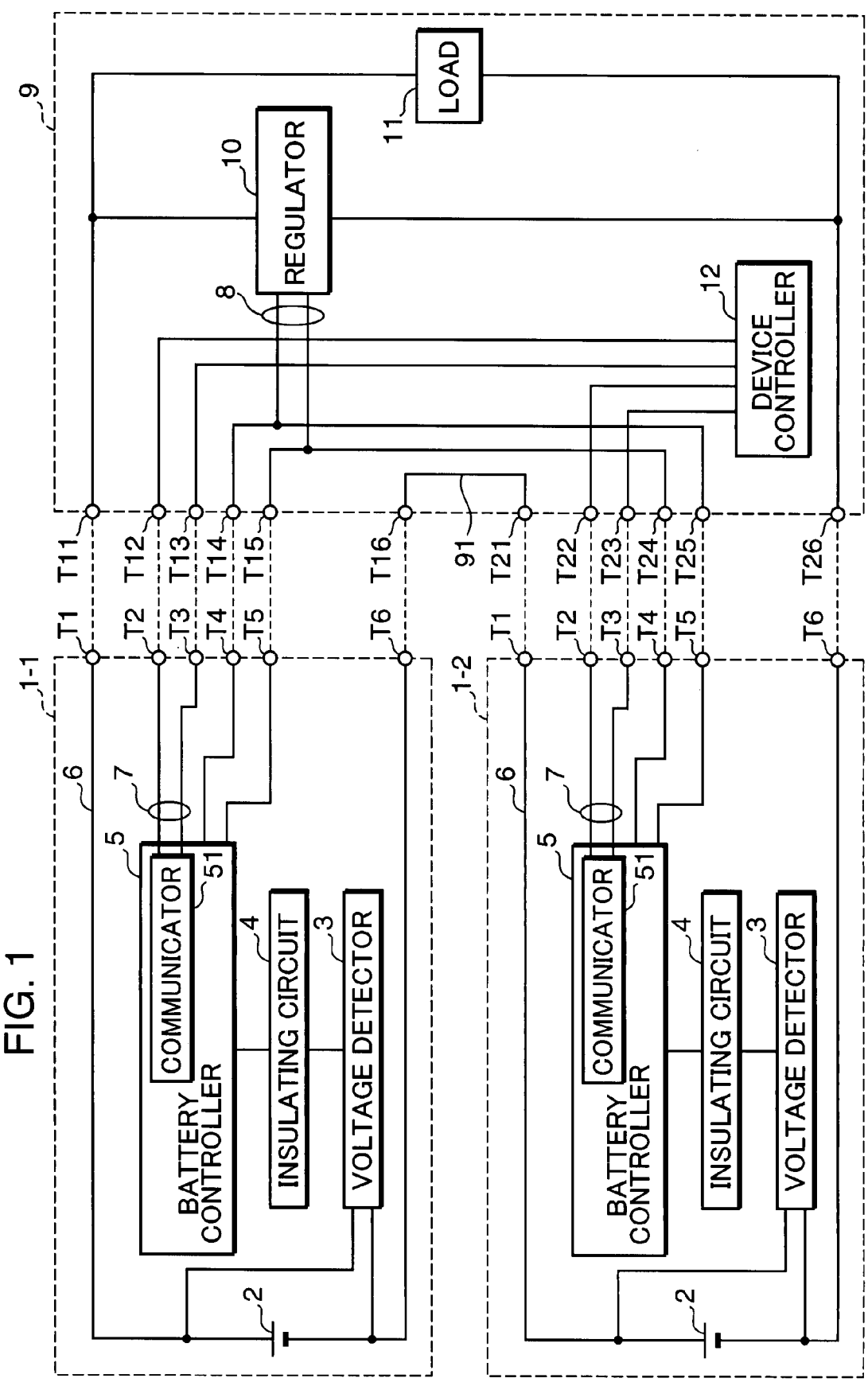
FIG. 1 is a circuit diagram showing an example of a configuration of battery packs and an electric device according to a first embodiment of the invention.

In the following, embodiments of the invention are described referring to the drawings. It should be appreciated that the following embodiments are merely examples embodying the invention, and do not limit the technical scope of the invention. Elements with the same reference numerals throughout the drawings have identical constructions, and accordingly, repeated description thereof will be omitted herein.

Figure 2:
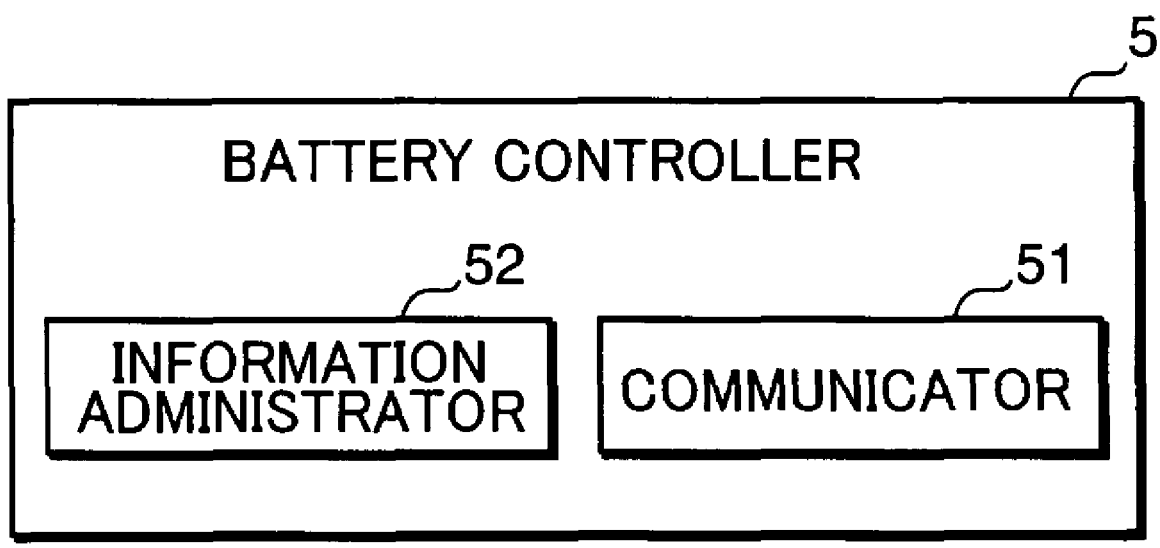
FIG. 2 is a block diagram showing a configuration of a battery controller shown in FIG. 1.

FIG. 1 is a circuit diagram showing an example of a configuration of battery packs and an electric device according to a first embodiment of the invention. Referring to FIG. 1, a battery pack 1-1 (1-2) has a secondary battery 2, a voltage detector 3, an insulating circuit 4 as an insulating section, and a battery controller 5. The secondary battery 2 is constituted of e.g. a lithium ion battery. The voltage detector 3 detects a voltage of the secondary battery 2. The insulating circuit 4 insulates the secondary battery 2 and the battery controller 5. The battery controller 5 is constituted of e.g. a microcomputer, and is adapted to monitor the condition of the secondary battery 2. FIG. 2 is a block diagram showing a configuration of the battery controller 5 shown in FIG. 1. The battery controller 5 has a built-in communicator 51 and a built-in information administrator 52. The communicator 51 sends various information to or receives from a device 9 by communicating with the device 9. The information administrator 52 causes the communicator 51 to send battery information outputted from the voltage detector 3 to the device 9.

An output circuit 6 is a circuit for supplying an electric power outputted from the battery pack 1-1 (1-2) to the device 9. The communication line 7 is a wiring for communicating with a device controller 12 of the device 9. An electric power supply line 8 is a wiring for supplying an electric power from the device 9 to the battery controller 5 for operating the battery controller 5. Since the arrangements of the battery packs 1-1 and 1-2 are identical to each other, hereinafter, the battery packs 1-1 and 1-2 are generically called as "battery pack(s) 1".

Also, the battery pack 1 has a positive electrode terminal 1, communication terminals T2 and T3, electric power receiving terminals T4 and T5, and a negative electrode terminal T6. The positive electrode terminal T1 is connected to the positive electrode of the secondary battery 2, and the positive electrode of the secondary battery 2 is connected to the device 9. The negative electrode terminal T6 is connected to the negative electrode of the secondary battery 2, and the negative electrode of the secondary battery 2 is connected to the device 9. The communication terminals T2 and T3 are connected to the communicator 51 so as to connect the communicator 51 to the device 9 for transmission of a signal for communication. The electric power receiving terminals T4 and T5 are connected to the battery controller 5 to receive the electric power from the device 9 for operating the battery controller 5 including the communicator 51.

The voltage detector 3 as a voltage condition detector is constituted of e.g. an A/D converter, and is adapted to convert an end voltage of the secondary battery 2 into a digital signal, and to output the digital signal to the battery controller 5 via the insulating circuit 4. The insulating circuit 4 is an insulating section constituted of e.g. a photocoupler or a pulse transformer. The output circuit 6 is a wiring for connecting the positive electrode of the secondary battery 2 to the positive electrode terminal Ti. The communication terminals T2 and T3 are connected to the communicator 51 by the communication line 7, and the communication terminal T3 is connected to a reference potential side of the communication signal. The electric power receiving terminals T4 and T5 are connected to a power source terminal of the battery controller 5.

The device 9 as an electric device is connected to the battery pack 1. The device 9 is operable when the two battery packs 1 are connected in series to the device 9. The device 9 includes a regulator 10, a load of the device 9, and a device controller 12. The regulator 10 is adapted to supply a power source to the battery packs 1 by way of the power source supply lines 8. The device controller 12 is constituted of e.g. a microcomputer with a built-in communication circuit for controlling the device 9.

Also, the device 9 has device-side positive electrode terminals T11 and T21, device-side negative electrode terminals T16 and T26, device-side communication terminals T12, T13, T22, and T23, and device-side electric power output terminals T14, T15, T24, and T25. The regulator 10 and the load 11 are connected in parallel between the device-side positive electrode terminal T11 and the device-side negative electrode terminal T26. The device-side communication terminals T12, T13, T22, and T23 are connected to the device controller 12. An output voltage of the regulator 10 is applied between the device-side electric power output terminals T14 and T15 via the power source supply line 8, and between the device-side electric power output terminals T24 and T25 via the power source supply line 8, respectively. The device-side negative electrode terminal T16 and the device-side positive electrode terminal T21 are connected to each other by a connection wiring 91.

Alternatively, the battery pack 1 may be provided with a temperature sensor, as a battery condition detector, which is adapted to detect a temperature of the secondary battery 2 as battery information, in place of providing the voltage detector 3. In FIG. 1, the insulating circuit 4 is arranged between the voltage detector 3 and the battery controller 5. Alternatively, the insulating circuit 4 may be arranged between the secondary battery 2 and the voltage detector 3. In the embodiment, the regulator 10 is adapted to control a voltage to be supplied to the battery controller 5. Alternatively, an element substantially equivalent to the regulator 10 may be provided in the battery controller 5 of the battery pack 1 to control the voltage to be supplied to the battery controller 5.

Now, a series of operations of the embodiment having the above configuration are described. When the battery packs 1-1 and 1-2 are connected to the device 9, the positive electrode terminal T1, the communication terminals T2, T3, the electric power receiving terminals T4, T5, and the negative electrode terminal T6 of the battery pack 1-1 are respectively connected to the device-side positive electrode terminal T11, the device-side communication terminals T12, T13, the device-side electric power output terminals T14, T15, and the device-side negative electrode terminal T16 of the device 9. Likewise, the positive electrode terminal T1, the communication terminals T2, T3, the electric power receiving terminals T4, T5, and the negative electrode terminal T6 of the battery pack 1-2 are respectively connected to the device-side positive electrode terminal T21, the device-side communication terminals T22, T23, the device-side electric power output terminals T24, T25, and the device-side negative electrode terminal T26 of the device 9.

Also, the secondary battery 2 of the battery pack 1-1, and the secondary battery 2 of the battery pack 1-2 are connected in series by the connection wiring 91. With this arrangement, when a voltage obtained by series-connecting the two secondary batteries 2 is applied to the regulator 10 and to the load 11, an electric power is supplied to the device 9. After the electric power supplied from the battery packs 1-1 and 1-2 is regulated to respective voltages suitable for the battery controllers 5 by the regulator 10, while being supplied to the load 11 of the device 9, the regulated voltages are respectively supplied to the battery controller 5 and the communicator 51 of the battery pack 1-1 via the power source supply line 8, the device-side electric power output terminals T14, T15, and the electric power receiving terminals T4, T5; and to the battery controller 5 and the communicator 51 of the battery pack 1-2 via the power source supply line 8, the device-side electric power output terminals T24, T25, and the electric power receiving terminals T4, T5.

In response to supply of the electric power to the device 9, the information administrator 52 of the battery controller 5 in the battery pack 1-1 (1-2) is operated to acquire, via the insulating circuit 4, the battery information indicating the output voltage of the secondary battery 2, which is detected by the voltage detector 3. Then, the battery information acquired by the information administrator 52 of the battery controller 5 in the battery pack 1-1 is sent to the device controller 12 by the communicator 51 via the communication line 7, the communication terminals T2, T3, and the device-side communication terminals T12, T13. Likewise, the battery information acquired by the information administrator 52 of the battery controller 5 in the battery pack 1-2 is sent to the device controller 12 by the communicator 51 via the communication line 7, the communication terminals T2, T3, and the device-side communication terminals T22, T23.

In the embodiment, the information administrator 52 of the battery controller 5 is operative to send, to the device 9, information relating to the output voltage of the secondary battery 2 detected by the voltage detector 3, as the battery information. Alternatively, various information concerning the secondary battery 2 e.g. information relating to a residual capacity of the secondary battery 2 calculated based on a change in output voltage of the secondary battery 2, information relating to a current value capable of charging/discharging the secondary battery 2, information indicating a degraded condition of the secondary battery 2, or like information may be sent to the device 9, as the battery information.

Specifically, the information administrator 52 may be operative to determine the residual capacity of the secondary battery 2 based on the output voltage detected by the voltage detector 3, and to cause the communicator 51 to send information relating to the determined residual capacity to the device 9, as the battery information. In the altered arrangement, a functional formula representing a relation between the output voltage of the secondary battery 2 and the residual capacity of the secondary battery 2 is stored in advance, and the residual capacity is determined by substituting the detected output voltage in the functional formula. Alternatively, the information administrator 52 may be operative to store in advance table data representing the relation between the output voltage of the secondary battery 2 and the residual capacity of the secondary battery 2, and to determine the residual capacity corresponding to the detected output voltage by referring to the table data.

Further alternatively, the information administrator 52 may be operative to store in advance information relating to a current value capable of charging/discharging the secondary battery 2, and to cause the communicator 51 to send the information relating to the current value capable of charging/discharging to the device 9, as the battery information. In the altered arrangement, the information administrator 52 may be operative to store the information relating to the current value capable of charging/discharging the secondary battery 2 in an unillustrated ROM (read only memory) or a like medium so that the information relating to the current value is read from the ROM, and that the readout information relating to the current value is sent to the device 9 by the communicator 51.

Further alternatively, the information administrator 52 may be operative to compare the output voltage value detected by the voltage detector 3 with a predetermined value, and to cause the communicator 51 to send degradation information indicating that the secondary battery 2 is degraded to the device 9, as the battery information, if the output voltage value is equal to or smaller than the predetermined value. In the altered arrangement, the information administrator 52 is operated to store in advance the output voltage value of the secondary battery 2 in a degraded condition as the predetermined value, and to judge whether the output voltage value detected by the voltage detector 3 is equal to or smaller than the stored predetermined value. Then, if the output voltage value is equal to or smaller than the predetermined value, the information administrator 52 is operated to cause the communicator 51 to send the degradation information indicating that the secondary battery 2 is degraded to the device 9, as the battery information.

Then, the device controller 12 of the device 9 is operated to acquire the battery information of the secondary battery 2 in the battery pack 1-1 (1-2). Also, the device controller 12 controls the use condition of the secondary battery 2 e.g. regulates the electric power to be consumed by the load 11, or controls an unillustrated display device to display the residual capacity of the secondary battery 2.

In the above arrangement, since the power source voltage for operating the battery controller 5 and the communicator 51 in the battery pack 1-1 (1-2) is supplied from the regulator 10 of the device 9, the reference potential of the communication line 7 is set substantially equal to the reference potential of the output voltage outputted from the regulator 10. This enables to eliminate formation of a path through which a short-circuited current may flow, as exemplified by the short-circuit path X in FIG. 6. Also, since the voltage detector 3 connected to the both ends of the secondary battery 2, and the battery controller 5 are insulated by the insulating circuit 4, a current path from the secondary battery 2 via the voltage detector 3 to the battery controller 5 and the communicator 51 in the battery controller 5 is blocked. This enables to connect the battery pack 1 equipped with the communicator 51 to the device 9 without short-circuiting the secondary battery 2, whereby the device 9 is rendered usable by series-connecting the secondary batteries 2.

Also, since both of the battery packs 1-1 and 1-2 are communicable with the device controller 12, the device 9 is allowed to use the electric power of the secondary batteries 2, while checking the conditions of all the battery packs 1 connected to the device 9.

Alternatively, the battery pack 1 may further include, as a battery condition detector, a temperature sensor for detecting a temperature of the secondary battery 2 as battery information, and a current detector for detecting a current value to be supplied to the secondary battery 2 as battery information, in addition to the voltage detector 3.

Figure 3:
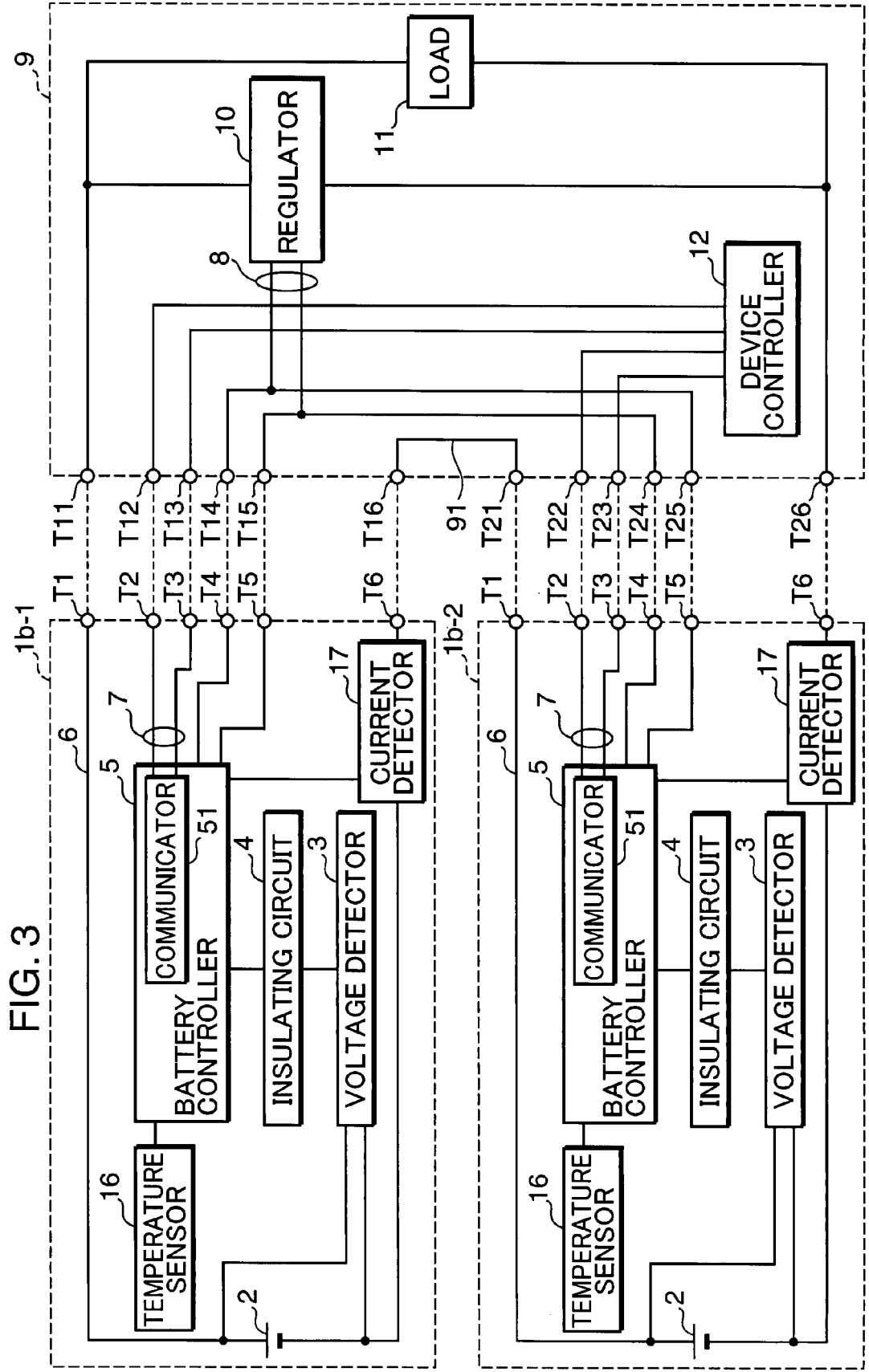
FIG. 3 is a circuit diagram showing an example of a configuration of battery packs and an electric device according to a modification of the first embodiment.

FIG. 3 is a circuit diagram showing an example of a configuration of a battery pack 1b (battery packs 1b-1 and 1b-2) and a device 9, as a modification of the first embodiment. The battery pack 1b shown in FIG. 3 is different from the battery pack 1 shown in FIG. 1 in the following point. Specifically, the battery pack 1b shown in FIG. 3 is further provided with a temperature sensor 16 and a current detector 17.

The temperature sensor 16 is adapted to detect a temperature of a surface of the secondary battery 2 to output the detection data to the information administrator 52 as battery information. The information administrator 52 of the battery controller 5 is operated to cause the communicator 51 to send the battery information outputted by the temperature sensor 16 to the device 9. The current detector 17 is adapted to detect a charging current to be supplied to the secondary battery 2, or a discharging current to output the detection data to the information administrator 52, as battery information. The information administrator 52 of the battery controller 5 is operated to cause the communicator 51 to send the battery information outputted by the current detector 17 to the device 9.

Then, the device controller 12 of the device 9 is operated to acquire the battery information of the secondary battery 2 in the battery pack 1b-1 (1b-2). The device controller 12 controls the use condition of the secondary battery 2 based on the acquired battery information. For instance, if the battery information indicates a temperature of the secondary battery 2, the device controller 12 judges whether the detected temperature lies within a predetermined temperature range, which is defined in advance. If the device controller 12 judges that the detected temperature does not lie in the predetermined temperature range, the device controller 12 suspends a charge/discharge of the secondary battery 2. The device controller 12 stores data concerning the predetermined temperature range in advance. Accordingly, if the temperature of the secondary battery 2 is unduly increased due to some reason, the charge/discharge of the secondary battery 2 is suspended. This enables to prevent breakage or damage of the secondary battery 2 due to an abnormal temperature rise.

Alternatively, the information administrator 52 may be operative to acquire detection data concerning a discharging current from the current detector 17 every predetermined time interval to calculate a residual capacity of the secondary battery 2 by integrating the discharging current flowing from the secondary battery 2, and to cause the communicator 51 to send the information relating to the calculated residual capacity to the device 9, as battery information.

Further alternatively, the information administrator 52 may be operative to specify a correction ratio with respect to a temperature indicated by the temperature information outputted from the temperature sensor 16, by referring to a correction table, and to calculate a corrective residual capacity by multiplying the specified correction ratio by a residual capacity determined based on an output voltage or a discharging current value. The correction table stores temperatures of the secondary battery 2, and values of correction ratios corresponding to the temperatures in association with each other. The values of correction ratios are empirically obtained in advance by conducting an experiment or the like. The information administrator 52 causes the communicator 51 to send information relating to the corrective residual capacity to the device 9.

In the modification of the first embodiment, the battery pack 1b is provided with the temperature sensor 16 and the current detector 17. The invention is not limited to the above. Either one of the temperature sensor 16 and the current detector 17 may be provided.

Figure 4:
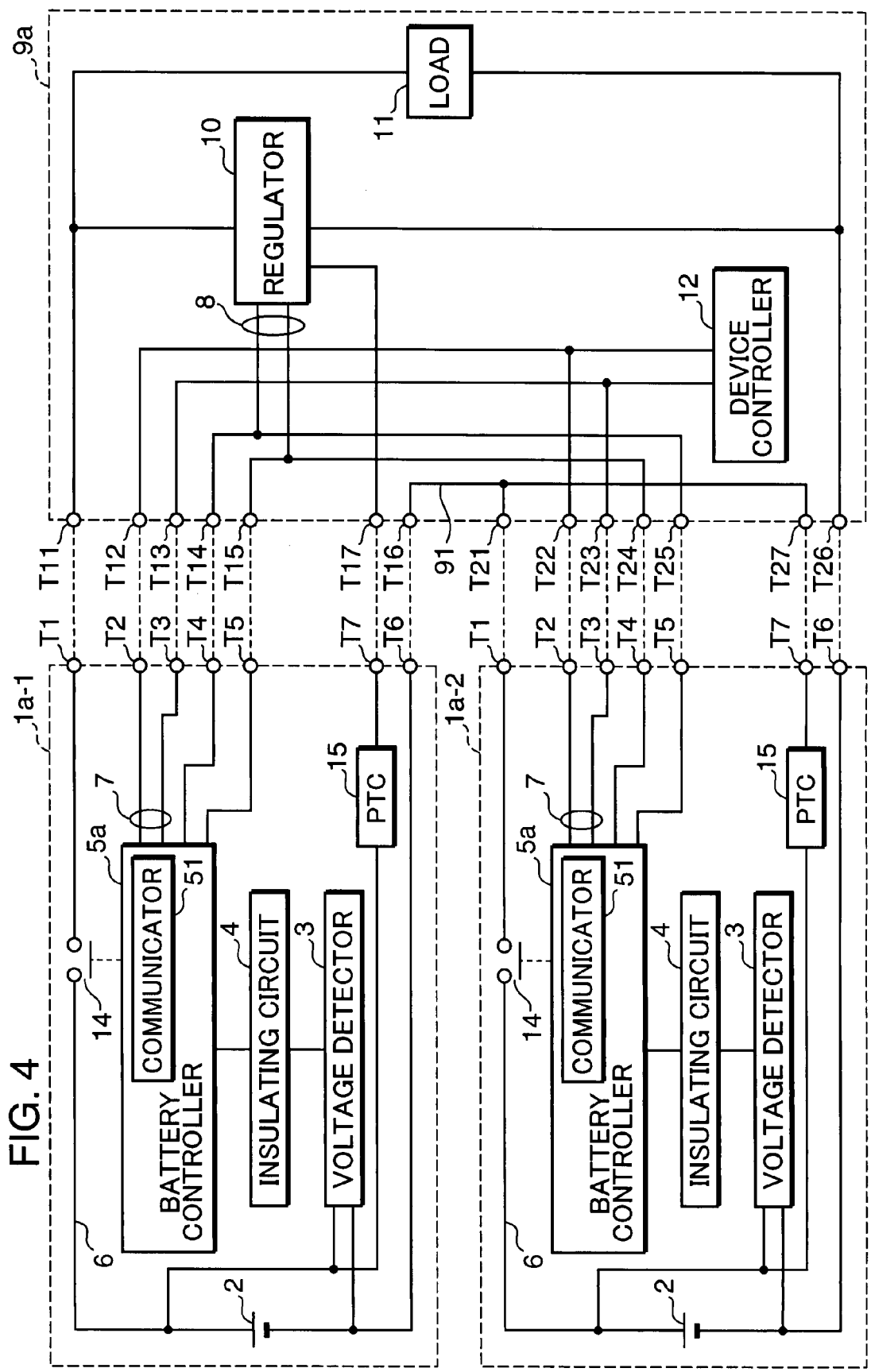
FIG. 4 is a circuit diagram showing an example of a configuration of battery packs and an electric device according to a second embodiment of the invention.

In the following section, battery packs and an electric device according to a second embodiment of the invention are described. FIG. 4 is a circuit diagram showing an example of a configuration of battery packs 1a (battery packs 1a-1 and 1a-2) and a device 9a according to the second embodiment of the invention. The battery pack 1a shown in FIG. 4 is different from the battery pack 1 shown in FIG. 1 in the following point. Specifically, the battery pack 1a shown in FIG. 4 is further provided with a switching device 14 as a switching section, and a power output terminal T7 and a PTC (Positive Temperature Coefficient) 15, as an overcurrent protective device. The switching device 14 is arranged between the positive electrode of the secondary battery 2, and the positive electrode terminal T1. The power output terminal T7 is adapted to output an output power of the secondary battery 2 to the device 9a. The PTC 15 is arranged between the positive electrode of the secondary battery 2, and the power output terminal T7.

Figure 5:
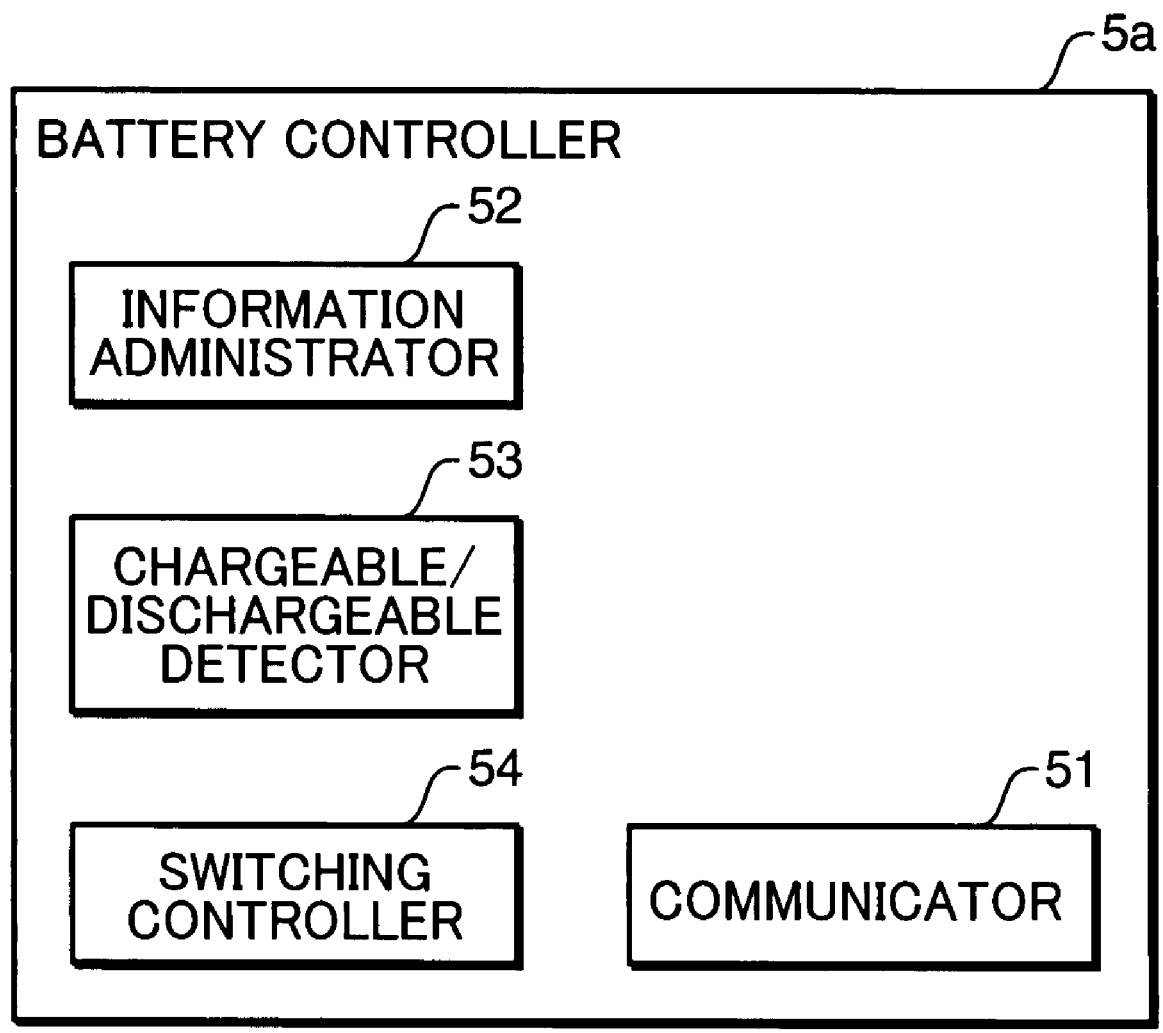
FIG. 5 is a block diagram showing a configuration of a battery controller shown in FIG. 4.

FIG. 5 is a block diagram showing a configuration of a battery controller 5a shown in FIG. 4. The battery controller 5a includes an information administrator 52, a chargeable/dischargeable detector 53, and a switching controller 54. The chargeable/dischargeable detector 53 detects whether the secondary battery 2 is in a chargeable/dischargeable condition, based on the output voltage of the secondary battery 2, which is detected by the voltage detector 3. The switching controller 54 controls the switching device 14 to turn on, if the chargeable/dischargeable detector 53 detects that the secondary battery 2 is in a chargeable/dischargeable condition. Then, the information administrator 52 in one of the battery packs 1a is operated to cause the communicator 51 thereof to acquire the battery information of the secondary battery 2 in the other one of the battery packs 1a from the battery controller 5a in the other battery pack 1a, and to cause the communicator 51 to send, to the device 9a, collective information obtained by integrating the battery information acquired by the communicator 51 and the battery information detected by the voltage detector 3 in the one battery pack 1a.

The device 9a shown in FIG. 4 is different from the device 9 shown in FIG. 1 in the following point. Specifically, the device 9a shown in FIG. 4 is further provided with a device-side electric power receiving terminal T17 and a relay terminal T27. When the battery packs 1a-1 and 1a-2 are connected to the device 9a, the device-side electric power receiving terminal T17 is connected to the electric power output terminal T7 in the battery pack 1a-1, and the relay terminal T27 is connected to the electric power output terminal T7 in the battery pack 1a-2. The device-side electric power receiving terminal T17 is connected to the input terminal of the regulator 10, and the relay terminal T27 is connected to the device-side negative electrode terminal T16. Also, the device-side communication terminals T12 and T13 are respectively connected to the device-side communication terminals T22 and T23. With this arrangement, the battery pack 1a-1 and the battery pack 1a-2 connected to the device 9a are rendered communicable with each other.

A switching device such as a transistor or a relay switch may be used as the switching device 14. The switching device 14 is not limited to a device having such a configuration as to be turned on/off by the switching controller 54 of the battery controller 5a, but may include e.g. a manual operation switch. As far as a current can be regulated in an overcurrent condition, the overcurrent protective device is not limited to the PTC, but may include e.g. a safety fuse or a bimetal switch.

Since the arrangements of the elements other than the above in the second embodiment are identical to those in the first embodiment, description thereof will be omitted herein. In the following, a series of operations concerning the second embodiment are described. The switching device 14 of the battery pack 1a is configured in such a manner that whereas the switching device 14 is controlled by the switching controller 54 of the battery controller 5a while the switching controller 54 is operated, the switching device 14 is turned off while the switching controller 54 is not operated. When the two battery packs 1a e.g. the battery packs 1a-1 and 1a-2 are connected in series to the device 9a, the positive electrode of the secondary battery 2 in the battery pack 1a-1 is connected to the regulator 10 via the PTC 15, the electric power output terminal T7, and the device-side electric power receiving terminal T17. The negative electrode of the secondary battery 2 in the battery pack 1a-1 is connected to the positive electrode of the secondary battery 2 in the battery pack 1a-2 via the negative electrode terminal T6, the device-side negative electrode terminal T16, the relay terminal T27, the electric power output terminal T7, and the PTC 15. Also, the negative electrode of the secondary battery 2 in the battery pack 1a-2 is connected to the regulator 10 via the negative electrode terminal T6 and the device-side negative electrode terminal T26. Thus, an electric power obtained by connecting the two secondary batteries 2 in series is supplied to the regulator 10.

After the supplied electric power is regulated to a voltage suitable for the battery controller 5a in the battery pack 1a-1 by the regulator 10, the regulated voltage is supplied to the battery controller 5a and the communicator 51 in the battery pack 1a-1 via the device-side electric power output terminals T14, T15, and the electric power receiving terminals T4, T5. Likewise, a regulated voltage is supplied to the battery controller 5a and the communicator 51 in the battery pack 1a-2 via the device-side electric power output terminals T24, T25, and the electric power receiving terminals T4, T5.

In this arrangement, similarly to the battery pack 1 shown in FIG. 1, the power source voltages for operating the battery controllers 5a and the communicators 51 of the battery packs 1a are supplied from the regulator 10 in the device 9a, respectively. This enables to eliminate formation of a current path through which a short-circuited current may flow, as exemplified by the short-circuit path X in FIG. 6. Also, since a current path from the secondary battery 2 via the voltage detector 3 to the battery controller 5a and the communicator 51 provided in the battery controller 5a is blocked by the insulating circuit 4. This enables to connect the battery pack 1a equipped with the communicator 51 to the device 9a without short-circuiting the secondary battery 2, and to use the device 9a by series-connecting the secondary batteries 2.

In response to supply of an electric power from the device 9a, the battery controller 5a in the battery pack 1a-1 (1a-2) is operated to acquire, via the insulating circuit 4, battery information indicating the output voltage of the secondary battery 2, which is detected by the voltage detector 3. Then, if the detected output voltage of the secondary battery 2 lies in a predetermined voltage range, the chargeable/dischargeable detector 53 of the battery controller 5a judges that the secondary battery 2 is in a chargeable/dischargeable condition. If the chargeable/dischargeable detector 53 judges that the secondary battery 2 is in a chargeable/dischargeable condition, the switching controller 54 controls the switching device 14 to turn on so as to start supplying an electric power from the secondary battery 2 to the device 9a for operating the load 11. If the chargeable/dischargeable detector 53 judges that the secondary battery 2 is not in a chargeable/dischargeable condition, the switching controller 54 keeps the switching device 14 in an OFF-state, without causing the switching device 14 to turn on.

Then, the information administrator 52 of the battery controller 5a in one of the battery packs 1a-1 and 1a-2 which has started communication earlier than the other one of the battery packs 1a-1 and 1a-2 e.g. the battery pack 1a-1 is operated to cause the communicator 51 thereof to send, to the information administrator 52 of the battery controller 5a in the battery pack 1a-2, a request command of requesting the battery information of the secondary battery 2 in the battery pack 1a-2 via the communication terminals T2, T3 of the battery pack 1a-1, the device-side communication terminals T12, T13, the device-side communication terminal T22, T23, and the communication terminals T2, T3 of the battery pack 1a-2. In response to the request command, the information administrator 52 of the battery controller 5a in the battery pack 1a-2 is operated to cause the communicator 51 thereof to send the battery information indicating the output voltage of the secondary battery 2 in the battery pack 1a-2 to the information administrator 52 of the battery controller 5a in the battery pack 1a-1 via the communications terminals T2, T3 of the battery pack 1a-2, the device-side communication terminals T22, T23, the device-side communication terminal T12, T13, and the communication terminals T2, T3 of the battery pack 1a-1. In this way, the battery information indicating the output voltage of the secondary battery 2 in the battery pack 1a-2 is acquired by the communicator 51 in the battery pack 1a-1.

Further, the information administrator 52 of the battery controller 5a in the battery pack 1a-1 is operated to integrate the information relating to the output voltage of the secondary battery 2 in the battery pack 1a-2 acquired by the communicator 51, and the information relating to the output voltage of the secondary battery 2 detected by the voltage detector 3 in the battery pack 1a-1. Specifically, the information administrator 52 of the battery pack 1a-1 is operated to calculate an average value of the output voltages of e.g. the two secondary batteries 2 in the battery packs 1a-1 and 1a-2, and to cause the communicator 51 thereof to send the calculated average value, as a representative value, to the device controller 12 via the communication terminals T2, T3 and the device-side communication terminals T12, T13. Alternatively, the battery controller 5a may send the information relating to the output voltages of the secondary batteries 2 as they are without implementing the averaging process, or may send a representative value obtained by implementing a process other than the averaging process, in place of sending the average value of the output voltages of the secondary batteries 2 to the device controller 12.

Thus, by communicating with one of the battery packs 1a connected to the device 9a, the device controller 12 of the device 9a is operative to acquire the battery information of the secondary batteries 2 in all the battery packs 1a connected to the device 9a, or information collectively the battery information of the secondary batteries 2. This arrangement enables to eliminate the need of providing a port in the device controller 12 for communicating with the battery packs 1a, or collecting the battery information obtained from the battery packs 1a, thereby reducing a processing load of the device controller 12.

If, on the other hand, the battery pack 1a is detached from the device 9a, the electric power supply to the battery controller 5a is suspended, and as a result, the switching device 14 is turned off. In this state, even if unduly charge/discharge of the secondary battery 2 from the positive electrode terminal T1 is attempted, charge/discharge is disabled. This enables to enhance safety against overcharge or overdischarge of the secondary battery 2.

Also, in the case where the charging/discharging current from the electric power output terminal T7 is unduly increased, the charging/discharging current in the secondary battery 2 is restricted by the PTC 15. This enables to enhance safety of the battery pack 1a.

Further, both in the first embodiment and the second embodiments, an electric power is supplied to the battery controllers 5 (5a) and the communicators 51 exclusively when the battery packs 1 (1a) are connected to the device 9 (9a). This enables to eliminate electric power consumption by the microcomputer or the IC (Integrated Circuit) constituting the battery controller 5 (5a) in a condition that the battery pack 1 (1a) is detached from the device 9 (9a). This enables to suppress lowering of the residual capacity of the secondary battery 2 in long-term storage of the battery pack 1 (1a).

Furthermore, a charger for individually charging the battery pack 1 (1a) is so constructed as to output a charging voltage of the battery pack, which is considerably lower than the operation voltage of the device to be used by series-connecting the battery packs. This makes it easy to fabricate the charger at a low cost.

The battery pack with a built-in secondary battery according to the embodiments of the invention is connectable to devices operated at different voltages by series-connecting a required number of the battery packs, while monitoring and controlling the secondary battery. Thus, the inventive battery pack is useful as a series-connectable battery pack.

The aforementioned embodiments primarily embrace the invention having the following arrangements.

A battery pack according to an aspect of the invention comprises: a secondary battery; a positive electrode terminal for connecting a positive electrode of the secondary battery to an external electric device; a negative electrode terminal for connecting a negative electrode of the secondary battery to the electric device; a communicator for communicating with the electric device; a communication terminal adapted to be used in connecting the communicator to the electric device to send a signal for the communication; and an electric power receiving terminal for receiving an electric power from the electric device to operate the communicator, wherein the communicator is operated by the electric power received by the electric power receiving terminal.

In the above arrangement, the output power of the secondary battery is supplied to the electric device by the positive electrode terminal and by the negative electrode terminal. The communicator is operative to send the signal for communication via the communication terminal. The electric power for operating the communicator is received by the electric power receiving terminal, which is provided independently of the positive electrode terminal and the negative electrode terminal. This arrangement enables to eliminate formation of a short-circuit path, which may short-circuit the secondary battery through the communicator in series-connecting the battery packs having the above arrangement. Thus, there is no likelihood that the secondary battery may be short-circuited in series-connecting the battery packs.

Preferably, the battery pack may further comprise: a switching device for turning on and off a current path from the negative electrode terminal via the secondary battery to the positive electrode terminal; and an electric power output terminal for outputting an output power of the secondary battery to the electric device to allow the electric power receiving terminal to receive the output power via the electric device.

In the above arrangement, the electric power output terminal for outputting the output power of the secondary battery to the external electric device is provided independently of the positive electrode terminal and the negative electrode terminal. This enables to operate the communicator, even if the switching device is in an OFF-state, by supplying the electric power outputted from the electric power output terminal to the electric power receiving terminal.

Preferably, the battery pack may further comprise: a chargeable/dischargeable detector for detecting whether the secondary battery is in a chargeable/dischargeable condition; and a switching controller for controlling the switching device to turn on the current path if the chargeable/dischargeable detector detects that the secondary battery is in the chargeable/dischargeable condition.

In the above arrangement, if the chargeable/dischargeable detector detects that the secondary battery is in the chargeable/dischargeable condition, the switching device is turned on to thereby form a current path from the negative electrode terminal via the secondary battery to the positive electrode terminal. This enables to suppress charge/discharge of the secondary battery from the negative electrode terminal and the positive electrode terminal, without turning on the switching device, if the secondary battery is not in the chargeable/dischargeable condition. This is advantageous in enhancing safety of the secondary battery. With this arrangement, the secondary battery is brought to a usable condition readily when being connected to an electric device properly usable with the battery pack, while suppressing unduly charge/discharge of the secondary battery from the positive electrode terminal and the negative electrode terminal by turning off the switching device, if the secondary battery is not in the chargeable/dischargeable condition.

Preferably, the battery pack may further comprise: an overcurrent protective device, provided on the current path from the secondary battery to the electric power output terminal, for suppressing an overcurrent.

In the above arrangement, since the overcurrent outputted from the electric power output terminal can be suppressed by the overcurrent protective device, the secondary battery can be protected from discharge of the overcurrent.

Preferably, the battery pack may further comprise a battery condition detector for acquiring battery information indicating a condition of the secondary battery to output the battery information; and an information administrator for causing the communicator to send the battery information outputted by the battery condition detector to the electric device.

In the above arrangement, since the battery information acquired by the battery condition detector is sent to the electric device by the communicator, the electric device is capable of acquiring the battery information. This allows the electric device to use the electric power of the secondary battery, while checking the condition of the secondary battery.

Preferably, in the battery pack, the battery condition detector may be operative to detect an output voltage of the secondary battery as the battery information, and the battery pack may further include an insulating section, on a signal path from the secondary battery via the battery condition detector to the information administrator, for electrically insulating between the secondary battery and the information administrator. In the case where the secondary battery is constituted of cells, this arrangement embraces an arrangement of acquiring individual cell voltages.

In the above arrangement, the battery condition detector is operative to detect the output voltage of the secondary battery, and the output voltage of the secondary battery is outputted to the information administrator. Also, the insulating section electrically insulates between the secondary battery and the information administrator. This arrangement enables to eliminate formation of a current short-circuit path from the secondary battery via the battery condition detector, the information administrator, and the communicator. Thus, there is no likelihood that the secondary battery may be short-circuited in series-connecting the battery packs.

Preferably, in the battery pack, the battery condition detector may be operative to detect an output voltage of the secondary battery as the battery information, and the information administrator may be operative to determine a residual capacity of the secondary battery based on the output voltage detected by the battery condition detector, and to cause the communicator to send the determined residual capacity to the electric device, as the battery information.

In the above arrangement, the battery condition detector is operative to detect the output voltage of the secondary battery, and the output voltage of the secondary battery is outputted to the information administrator. Also, the information administrator is operative to determine the residual capacity of the secondary battery based on the detected output voltage, and to cause the communicator to send the determined residual capacity to the electric device, as the battery information. With this arrangement, since the electric device is capable of acquiring the residual capacity of the secondary battery, the electric device is allowed to use the electric power of the secondary battery while checking the residual capacity of the secondary battery, and to inform the residual capacity to the user.

Preferably, in the battery pack, the battery condition detector may be operative to detect an output voltage of the secondary battery as the battery information, and the information administrator may be operative to compare the output voltage detected by the battery condition detector with a predetermined value, and to cause the communicator to send, to the electric device, degradation information indicating that the secondary battery is degraded, as the battery information, if the output voltage is equal to or smaller than the predetermined value.

In the above arrangement, the battery condition detector is operative to detect the output voltage of the secondary battery, and the output voltage of the secondary battery is outputted to the information administrator. Also, the information administrator is operative to compare the detected output voltage with the predetermined value to cause the communicator to send, to the electric device, the degradation information indicating that the secondary battery is degraded, as the battery information, if the output voltage is equal to or smaller than the predetermined value. With this arrangement, since the electric device is capable of acquiring the degradation information indicating that the secondary battery is degraded, the electric device is allowed to check the degraded condition of the secondary battery. Accordingly, if the electric device receives the degradation information, the electric device is operative to prompt the user to exchange the secondary battery or the battery pack incorporating the secondary battery.

Preferably, in the battery pack, the battery condition detector may be operative to detect a current value to be supplied to the secondary battery as the battery information. With this arrangement, since the current value to be supplied to the secondary battery, which is detected by the battery condition detector, is sent to the electric device by the communicator, the electric device is capable of acquiring the current value to be supplied to the secondary battery. Accordingly, the electric device is allowed to use the electric power of the secondary battery, while checking the current value to be supplied to the secondary battery.

Preferably, in the battery pack, the battery condition detector may be operative to detect a temperature of the secondary battery as the battery information. In this arrangement, since the temperature of the secondary battery, which is detected by the battery condition detector, is sent to the electric device by the communicator, the electric device is capable of acquiring the temperature of the secondary battery. Accordingly, the electric device is allowed to use the electric power of the secondary battery, while checking the temperature of the secondary battery.

Preferably, in the battery pack, the communicator may be so constructed as to be communicable with another one of the battery pack when being connected to the another one battery pack by the electric device, and the information administrator may be operative to cause the communicator to acquire battery information of a secondary battery of the another one battery pack from an information administrator of the another one battery pack, and to cause the communicator to send, to the electric device, the battery information acquired by the communicator and the battery information detected by the battery condition detector of the battery pack, as collective information.

In the above arrangement, in the case where the battery pack is connected to the another one battery pack by the electric device, the information administrator is operative to cause the communicator to acquire the battery information of the secondary battery in the another one battery pack from the information administrator in the another one battery pack, and to cause the communicator to send, to the electric device, the battery information acquired by the communicator and the battery information detected by the battery condition detector in the battery pack, as the collective information. Accordingly, the electric device is allowed to acquire the secondary battery information concerning the battery packs by communicating with one of the battery packs, without individually communicating with the battery packs connected to the electric device. This enables to reduce a communication load of the electric device.

Preferably, in the battery pack, the battery information may include an output voltage of the secondary battery, and the information administrator may be operative to cause the communicator to acquire the output voltage of the secondary battery of the another one battery pack from the information administrator of the another one battery pack, to calculate an average value of the output voltage represented by the output voltage acquired by the communicator and the output voltage detected by the battery condition detector of the battery pack, and to cause the communicator to send the calculated average value to the electric device.

In the above arrangement, the information administrator is operative to cause the communicator to acquire the output voltage of the secondary battery in the another one battery pack from the information administrator in the another one battery pack, to calculate the average value of the output voltage represented by the output voltage acquired by the communicator and the output voltage detected by the battery condition detector in the battery pack, and to cause the communicator to send the calculated average value to the electric device. Accordingly, the electric device is allowed to acquire the average value of the output voltages of the secondary batteries in the battery packs connected to the electric device, which allows the electric device to use the electric power of the secondary batteries, while checking the conditions of the secondary batteries.

An electric device according to another aspect of the invention is an electric device connectable to the aforementioned battery pack in plural numbers. The electric device comprises: a connection wiring for series-connecting the secondary batteries provided in the battery packs in connecting the battery packs; device-side communication terminals each adapted to be connected to the communication terminal of a corresponding one of the battery packs; and device-side electric power output terminals, each adapted to be connected to the electric power receiving terminal of the corresponding one of the battery packs, for outputting the electric power to operate the communicator.

In the above arrangement, in loading the plural battery packs, the secondary batteries provided in the battery packs are connected in series by the connection wiring. Also, the communication terminals of the battery packs are respectively connected to the device-side communication terminals. Thus, the battery packs are rendered communicable with each other via the device-side communication terminals. The device-side electric power output terminals for outputting the electric power to operate the communicators are respectively connected to the electric power receiving terminals of the battery packs. Thereby, the electric power for operating the communicators is supplied to the battery packs via the device-side electric power output terminals. In this arrangement, the electric power for operating the communicators is received by the electric power receiving terminals, which are provided independently of the positive electrode terminals and the negative electrode terminals of the battery packs. This arrangement enables to eliminate formation of a short-circuit path, which may short-circuit the secondary battery through the communicator in series-connecting the battery packs having the above arrangement. Thus, there is no likelihood that the secondary battery may be short-circuited in series-connecting the battery packs.

This application is based on Japanese Patent Application No. 2006-105221 filed on Apr. 6, 2006, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A battery pack, comprising:
   a secondary battery;
   a positive electrode terminal for connecting a positive electrode of the secondary battery to an external electric device;
   a negative electrode terminal for connecting a negative electrode of the secondary battery to the electric device;
   a communicator for communicating with the electric device;
   a communication terminal adapted to be used in connecting the communicator to the electric device to send a signal for the communication; and
   an electric power receiving terminal for receiving an electric power from the electric device to operate the communicator, wherein the communicator is operated by the electric power received by the electric power receiving terminal.

2. The battery pack according to claim 1, further comprising:
   a switching device for turning on and off a current path from the negative electrode terminal via the secondary battery to the positive electrode terminal; and
   an electric power output terminal for outputting an output power of the secondary battery to the electric device to allow the electric power receiving terminal to receive the output power via the electric device.

3. The battery pack according to claim 2, further comprising:
   a chargeable/dischargeable detector for detecting whether the secondary battery is in a chargeable/dischargeable condition; and
   a switching controller for controlling the switching device to turn on the current path if the chargeable/dischargeable detector detects that the secondary battery is in the chargeable/dischargeable condition.

4. The battery pack according to claim 2, further comprising:
   an overcurrent protective device, provided on the current path from the secondary battery to the electric power output terminal, for suppressing an overcurrent.

5. The battery pack according to claim 1, further comprising:
   a battery condition detector for acquiring battery information indicating a condition of the secondary battery to output the battery information; and
   an information administrator for causing the communicator to send the battery information outputted by the battery condition detector to the electric device.

6. The battery pack according to claim 5, wherein
   the battery condition detector is operative to detect an output voltage of the secondary battery as the battery information, and
   the battery pack further includes an insulating section, on a signal path from the secondary battery via the battery condition detector to the information administrator, for electrically insulating between the secondary battery and the information administrator.

7. The battery pack according to claim 5, wherein
   the battery condition detector is operative to detect an output voltage of the secondary battery as the battery information, and
   the information administrator is operative to determine a residual capacity of the secondary battery based on the output voltage detected by the battery condition detector, and to cause the communicator to send the determined residual capacity to the electric device, as the battery information.

8. The battery pack according to claim 5, wherein
   the battery condition detector is operative to detect an output voltage of the secondary battery as the battery information, and
   the information administrator is operative to compare the output voltage detected by the battery condition detector with a predetermined value, and to cause the communicator to send, to the electric device, degradation information indicating that the secondary battery is degraded, as the battery information, if the output voltage is equal to or smaller than the predetermined value.

9. The battery pack according to claim 5, wherein
   the battery condition detector is operative to detect a current value to be supplied to the secondary battery as the battery information.

10. The battery pack according to claim 5, wherein
    the battery condition detector is operative to detect a temperature of the secondary battery as the battery information.

11. The battery pack according to claim 5, wherein
    the communicator is so constructed as to be communicable with another one of the battery pack when being connected to the another one battery pack by the electric device, and
    the information administrator is operative to cause the communicator to acquire battery information of a secondary battery of the another one battery pack from an information administrator of the another one battery pack, and to cause the communicator to send, to the electric device, the battery information acquired by the communicator and the battery information detected by the battery condition detector of the battery pack, as collective information.

12. The battery pack according to claim 11, wherein
    the battery information includes an output voltage of the secondary battery, and
    the information administrator is operative to cause the communicator to acquire the output voltage of the secondary battery of the another one battery pack from the information administrator of the another one battery pack, to calculate an average value of the output voltage represented by the output voltage acquired by the communicator and the output voltage detected by the battery condition detector of the battery pack, and to cause the communicator to send the calculated average value to the electric device.

13. An electric device connectable to the battery pack of claim 1 in plural numbers, comprising:
    a connection wiring for series-connecting the secondary batteries provided in the battery packs in connecting the battery packs;
    device-side communication terminals each adapted to be connected to the communication terminal of a corresponding one of the battery packs; and
    device-side electric power output terminals, each adapted to be connected to the electric power receiving terminal of the corresponding one of the battery packs, for outputting the electric power to operate the communicator.

* * * * *